UNITED STATES PATENT OFFICE.

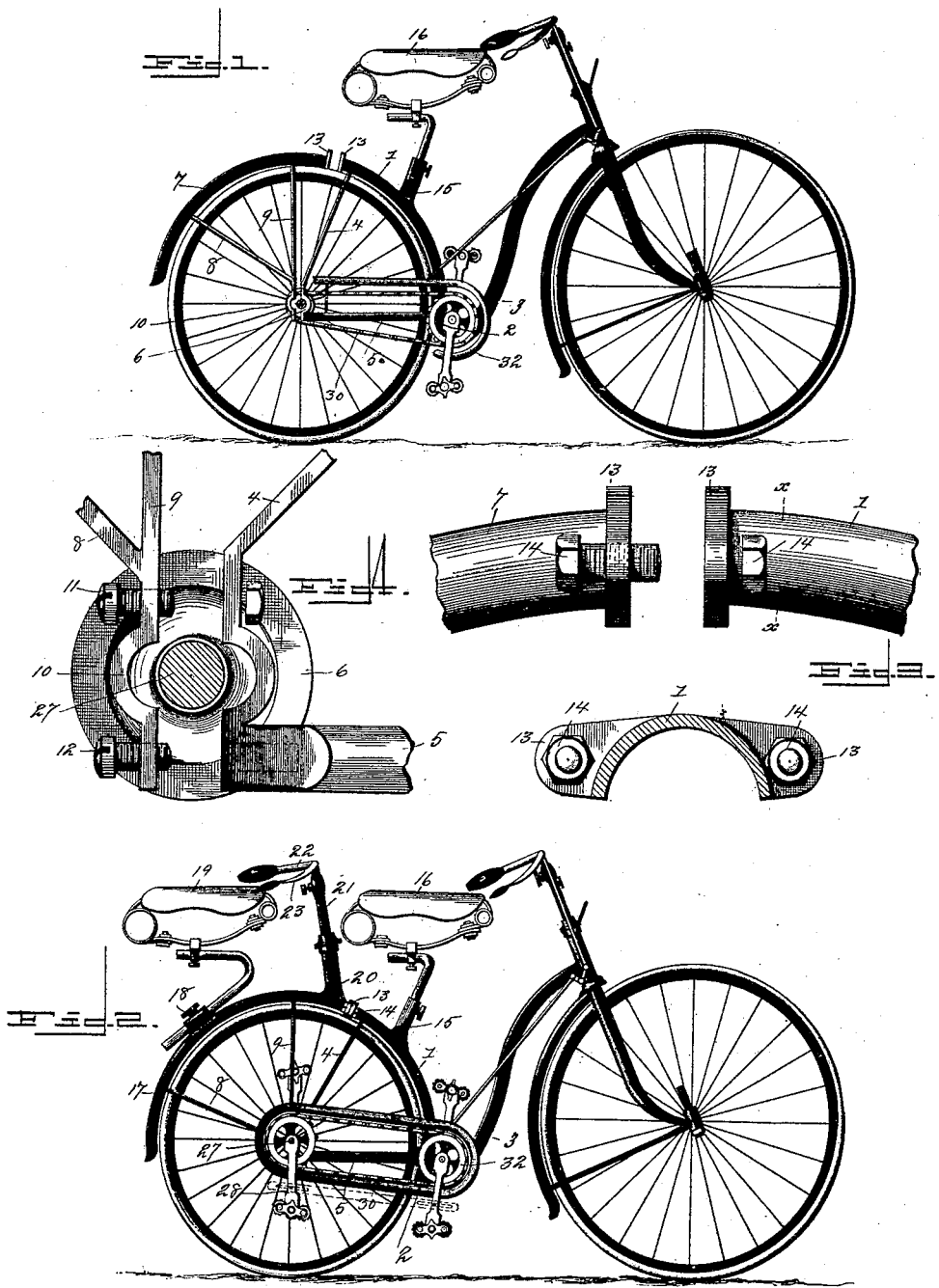

CHRISTIAN SONNESEN, OF TORRINGTON, CONNECTICUT.

BICYCLE.

SPECIFICATION forming part of Letters Patent No. 460,453, dated September 29, 1891.

Application filed April 4, 1891. Serial No. 387,598. (No model.)

*To all whom it may concern:*

Be it known that I, CHRISTIAN SONNESEN, a citizen of the United States, and a resident of Torrington, in the county of Litchfield, in the State of Connecticut, have invented a certain new and useful Improvement in Bicycles, of which the following is a specification, reference being had to the accompanying drawings, in which—

Figure 1 is a side elevation of a single machine, the rear portion being separated for clearness. Fig. 2 is a similar view of the tandem machine, the parts being shown in a similar position. Fig. 3 is an enlarged view of the means for securing together the separable portions of the machine. Fig. 4 is a view of the means of securing the rear axle-box portions together.

My invention has relation to bicycles of the "Safety" class, and my object is to provide a bicycle of this class that may be readily converted from a single to a "tandem" machine.

I will first describe my single bicycle as provided with a separable frame. The front wheel and forward portions of the frame are constructed as usual. The mud-guard is separably united, as will be hereinafter described. The forward portion 1 of the mud-guard is united to the spring-frame 3, as is usual, at a point 2. Near the rear end of the front portion of the mud-guard is secured a brace-rod 4, which extends toward the axle, and connected in any suitable manner to this brace-rod and to the rear end 5 of the spring-frame is a semicircular box 6, said box being provided at its ends with suitable holes. The rear portion of the mud-guard 7 of the single machine has inwardly-extending brace-rods 8 and 9, terminating at their lower ends in a semicircular box 10, said box being provided with bolt-holes and bolts 11 and 12 to secure said half-box to its corresponding front portion 6. The meeting ends of the front and rear portions of the mud-guard are provided with flanged plates 13 13, having suitable perforations for the insertion of securing-bolts 14 14. As is evident, instead of the above-described means for fastening the sections together, I may reduce one of the ends of the mud-guard and pass it into a socket in the end of the other portion of the guard and then secure the two portions together by means of a suitable bolt, or I may reduce one end and bifurcate the end of the other part of the mud-guard and secure by a bolt the two sections together. The front portion of the mud-guard has the usual socket-piece 15 for the support of the saddle 16. The axle of the rear wheel of the single machine is mounted in the boxes hereinbefore referred to and described, and may be a wheel of any ordinary or suitable construction. It will be seen that by putting the rear wheel in position, tightening up the bolts in the boxes, placing the drive-chain over the sprocket-wheels, and securing together the separable ends of the mud-guard I have a single Safety machine precisely similar to one of ordinary construction.

In order to convert said machine to a tandem or double bicycle, I proceed as follows: The bolts 11 and 12 are loosened and the bolts of the separable ends of the mud-guard are also loosened, and the rear portion of the mud-guard with its braces and semicircular yoke are then removed. I then take the substitute rear portion 17 of the mud-guard, which is provided with a similar end plate, brace-rods, and box-section and fastening devices to those previously described as connected with the portion of the mud-guard first mentioned and secure this in the position previously occupied by the removed single-section portion. Upon this portion 17 of the substitute guard I provide a suitable socket 18 for an adjustable saddle 19. This substitute portion is also provided with a socket 20 to receive a suitable handle-bar 21, which is adjustably and removably secured thereto. Connected with this handle-bar is a handle 22 of a supplemental brake 23, which may be thrown in contact with the periphery of the wheel just below the mud-guard, as shown. I will also state here that the first handle-bar is also provided with a suitable brake-handle, brake, and handle-bar, as shown in the drawings.

I provide the machine, when it is to be used as a tandem, with means whereby both riders may aid in the propulsion of the vehicle by removing the ordinary axle and through the hub pass a spindle 27 and to its ends connect pedals 28. I then secure this spindle to the hub either by means of washers and nuts or by a suitable clutch, so that upon the rear rider operating the pedals of the rear wheel motion will be communicated thereto. Upon the hub of the rear wheel is of course secured the usual sprocket-wheel 29, from which a drive-chain 30 extends to and over the forward usual sprocket-wheel 32.

I may build special rear wheels provided with permanent spindles and suitable means for attaching removable pedals thereto, so that in using this latter class of wheel it would be only necessary to attach the pedals to the spindles after the supplemental rear portion had been placed on and secured in position. I may also use as my rear wheel in the tandem machine the well-known "Broncho" rear wheel.

It is exceedingly obvious that various changes may be made in the details of construction of this machine, and I therefore wish it distinctly understood that I do not limit myself to the specific details of construction herein shown and described. It will also be seen that a machine of the construction described is cheap to manufacture, durable in use, and may be readily converted either from a single to a double or double to a single machine at the rider's will.

Having thus fully described my invention, what I claim herein as new, and desire to secure by Letters Patent of the United States, is—

1. A bicycle provided with a separable mud-guard and a separable box portion for the axle of the rear wheel, as set forth.

2. A bicycle provided with a separable mud-guard, the front section of which is secured to the spring-frame, said section provided with brace-bars and a half-box, a supplemental mud-guard section provided with brace-bars and a corresponding box-section, and means for uniting the mud-guard sections and the box-sections, as and for the purposes set forth.

3. A tandem bicycle provided with a separable mud-guard, the rear wheel of which bicycle is provided with a removable spindle and pedals, and means for rigidly securing said spindle to the hub of said wheel, as described.

4. A bicycle convertible from a single to a tandem, comprising a separable mud-guard, the sections of which are provided with separable journal-boxes, the front section having a saddle-support and saddle, the supplemental rear section of the mud-guard having a handle-bar, and a saddle-support and saddle, as described.

5. In a bicycle, the combination, with a mud-guard composed of two separable sections, of a substitute rear section, each of the said sections having braced thereto one-half of a separable axle-box, the said substitute rear section and the forward section being provided with seats and handles, substantially as described.

6. In a bicycle, the combination, with a mud-guard composed of separable sections, of a substitute rear section, each of the said sections having braced thereto one-half of a separable axle-box, and means for securing the said sections of the mud-guard and box together, substantially as described.

7. In a bicycle, the combination, with a mud-guard composed of separable sections, of a substitute rear section, each of the said sections having braced thereto one-half of a separable axle-box, and means for securing the said sections of the mud-guard and box together, an axle contained in the said box and carrying a supporting-wheel, and pedals removably connected with the said axle, substantially as described.

In testimony whereof I affix my signature in the presence of two subscribing witnesses.

CHRISTIAN SONNESEN.

Witnesses:
J. EVERETT ALDEN,
JOHN W. BROOKS.